Nov. 12, 1963    M. LATSHAW    3,110,146
MOWER ATTACHMENT FOR TRACTORS
Filed April 15, 1960    2 Sheets-Sheet 1
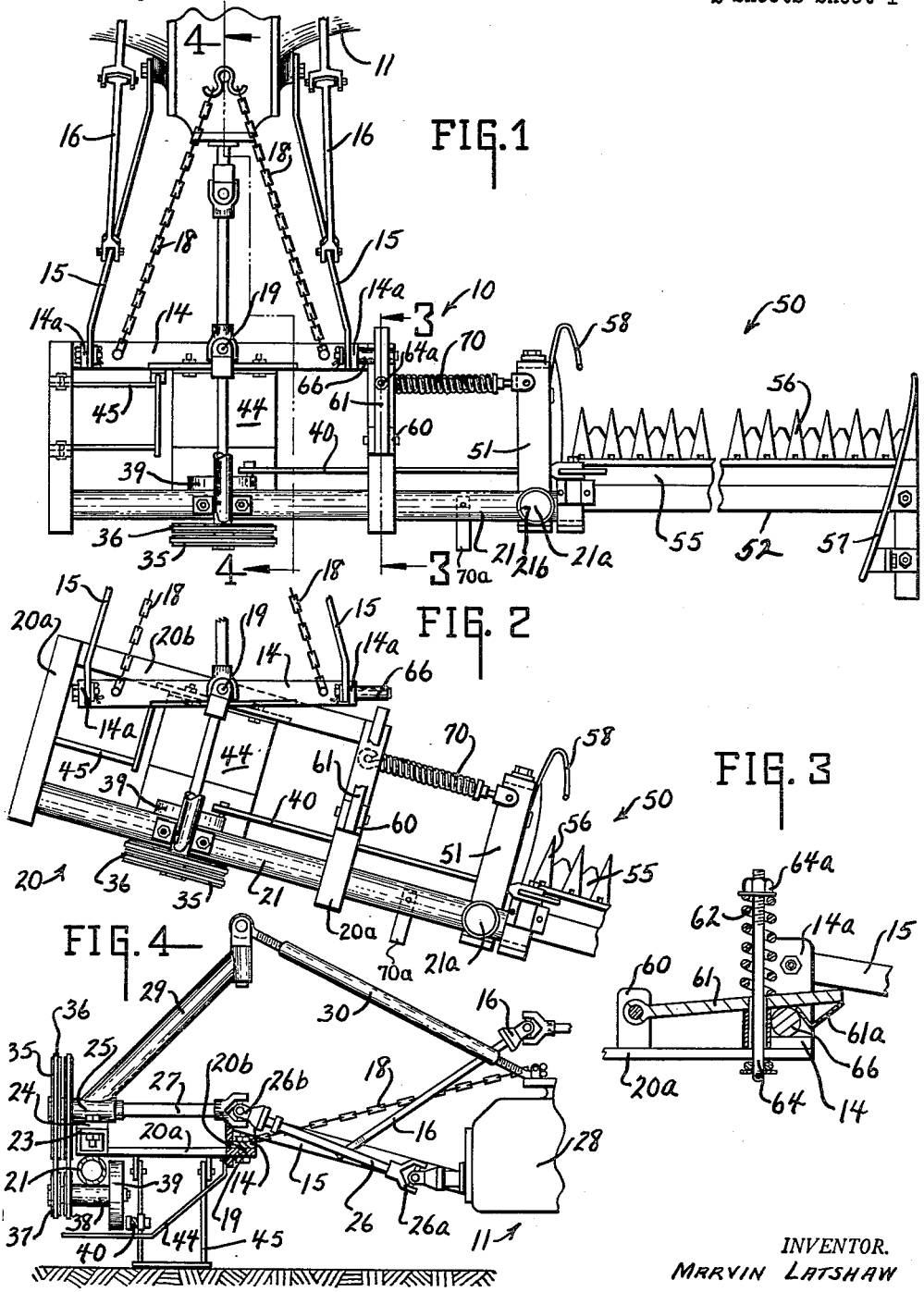
INVENTOR.
MARVIN LATSHAW
BY
Lockwood Woodard Smith & Weikart
Attorneys

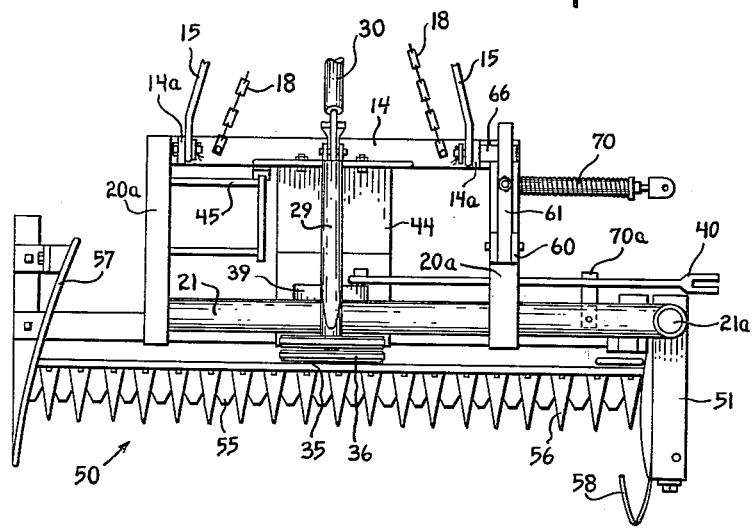

United States Patent Office 3,110,146
Patented Nov. 12, 1963

3,110,146
MOWER ATTACHMENT FOR TRACTORS
Marvin Latshaw, R.R. 1, Frankfort, Ind.
Filed Apr. 15, 1960, Ser. No. 22,544
2 Claims. (Cl. 56—25)

The present invention relates to a mower attachment for a tractor, and more particularly to a new and improved mower attachment where the cutter bar thereof is pivotable to a position behind the tractor when not in use and where the framework on which the cutter bar is mounted is releasable, and pivotable, if the cutter bar hits an object during use.

As is known, the mower attachments which have been in use heretofore in connection with common type tractors have included structure whereby the cutter bar is pivotable upwardly when not in use, and locked in such upward position through chain members, so that the mower may utilize a minimum of space when transported to a storage place and when in storage. Such prior apparatus, however, proved objectionable, considering the amount of force required to move the cutter bar from a horizontal position to the upwardly extending storage position.

Moreover, the prior mower attachments were disposed in a rigid relationship with reference to the tractor and, as a result, when an immovable object, such as a stump or a stone for example, was encountered during the mowing operation, the cutter bar was oftentimes damaged.

By virtue of the instant invention, the applicant has provided a new and novel mower attachment for a tractor whereby the cutter bar thereof is mounted on a framework which is pivotal around a vertical axis so that when the cutter bar is extended outwardly for use, and when an immovable object is encountered during such use, the framework and the cutting bar pivot, and thus prevent damage to the latter. In addition, the applicant's new and novel mower attachment includes structure whereby the cutter bar may be pivoted on another vertical axis to a position behind the tractor when not in use. In other words, with the latter structure, the total width of the mower attachment, when in nonextended position, is reduced considerably, providing effective transporting and storage without the necessity of the upward movement of the cutter bar required by prior machines.

Accordingly, the principal object of the present invention is to provide a new and novel mower attachment for a tractor having a framework which is pivotable about a vertical axis when the cutter bar thereof encounters an immovable object during use.

Another object of the present invention is to provide a new and novel mower attachment for a tractor having a cutter which may be swung to a position behind the tractor when not in use.

A further and more general object of the present invention is to provide a new and novel mower attachment for a tractor which is simple to use, and at the same time readily adaptable to existing tractors.

Other objects and a better understanding of the invention should become more apparent from the following description, taken in conjunction with the accompanying drawings, wherein FIG. 1 is a plan view, partly broken away, of the mower attachment forming the instant invention;

FIG. 2 is a partial plan view of the mower attachment of FIG. 1, showing the mower attachment pivoted from its normal position behind a tractor;

FIG. 3 is an enlarged view in vertical section, taken at line 3—3 of FIG. 2 and looking in the direction of the arrows, showing details of the framework locking mechanism;

FIG. 4 is a view partly in side elevation and partly in vertical section, taken at line 4—4 of FIG. 1 and looking in the direction of the arrows, showing further details of the instant mower attachment; and FIG. 5 is a plan view of the applicant's invention with the cutter blade thereof in a fully nonextended position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel mower attachment 10 is shown in conjunction with a common farm tractor 11. The mower attachment 10 includes a generally horizontally disposed frame member 14 having supporting elements 15 extending from brackets 14a thereon and fixed to the rear of the tractor 11. Control members 16, forming a part of the commonly known hydraulically operated lifting mechanism, extend from the tractor 11 to the supporting elements 15. Link chains 18 also extend from the tractor 11 to the frame member 14, in the conventional manner.

A framework 20 comprising side members 20a and a front member 20b is pivotable at 19 from a normal operating position where the front member 20b is beneath the frame member 14. Positioned between the side members 20a and extending outwardly therefrom is a tubular support element 21 which, in a typical embodiment of the invention, is welded thereto. A support member 23 is secured to the tubular support element 21 at the mid-point thereof between the side members 20a of the framework 20. Disposed on the support element 23 is a plate 24 which positions a housing 25. Power shafts 26, 27 extend from a power take-off 28 on the tractor 11 through common universal joints 26a, 26b. Housing 25 includes a bearing (not shown) for supporting shaft 27. Extending forwardly and angularly from the housing 25 is a support member 29 which has a downwardly extending turnbuckle element 30 pivotally attached thereto, the latter serving as brace for maintaining the vertical alignment of the entire mower attachment while the hydraulic mechanism of the tractor 11 is either raising or lowering the mower attachment 10.

Mounted at the end of the power shaft 27 are pulleys 35 having belts 36 thereon which extend around pulleys 37 rotatably disposed on a shaft (not shown) extending within a tubular member 38 secured to the support element 21. The aforesaid shaft has a pitman rod 40 secured eccentrically of the shaft to a disk 39 disposed at the opposite end thereof. The pitman rod 40 freely or pivotally connects to one end of the reciprocating knife member 55 of the conventional cutter bar assembly 50, to be discussed herebelow.

The remainder of the mower attachment centrally disposed in the area of the framework 20 includes a deflecting plate 44 for protecting the drive mechanism 39, 40 from debris, as well as a pivotable stand 45 which, when the mower attachment is not in use, may be caused to extend vertically downward to supply a bearing surface for the mower (see FIG. 4).

The applicant's novel arrangement for releasably locking the framework 20 in operative position is particularly disclosed in FIG. 3. A bracket assembly 60 is disposed on the upper surface of one of the frame members 20a from which a control member 61 having a catch 61a disposed on a lower surface thereon is pivotably disposed. The catch 61a is normally urged downwardly by a spring 62 which applies pressure on the control member 61. The spring member 62 is positioned around a bolt type element 64, with a nut 64a at one end thereof providing a bearing surface for the spring 62. The catch 61a on the control member 61 is normally in engagement with a rod 66 which is attached to and extends outwardly from bracket 14a on one end of frame 14.

In use, and with particular reference to FIGS. 1, 2 and 3, when the cutter assembly 50 strikes a rock, a stump or the like, the framework 20 pivots to the position disclosed by FIG. 2 by reason of the catch 61a on the control member 61 being released from its normal engaging position with rod 66. It should be apparent that after the immovable object has been passed, the cutter assembly 50, which is secured to the framework 20 through support member 21, can be readily rotated back to its operating position where the catch 61a on the control element 61 engages the rod 66.

Disposed at one end of the support member 21 is a vertical shaft 21a extending through a vertical journal member 21b attached to member 21. The inner end of the cutter bar assembly 50 may be attached in any suitable manner to shaft 21a for pivotal movement about its axis thereby to permit rotation of the cutter bar assembly into the position illustrated in FIG. 5. The cutter bar assembly 50 is generally conventional and comprises a base plate 52 slidably supporting the knife member 55 so that it may reciprocate within the finger members 56 in conventional manner. The assembly includes at its outer end a deflector 57 adapted to deflect stalks of grass or grain inwardly after they have been cut. Another deflector 58 is mounted adjacent the inner end of the cutter bar assembly for deflecting stalks of grass or grain outwardly of the mechanism. These deflectors and their functions are conventional.

For normally holding the cutter bar assembly in its extended position there is provided a heavy spring 70 attached between one of the frame members 20a and the end member 51 of the cutter bar assembly 50. Spring 70 and its function are also conventional in that it permits limited pivotal movement of the cutter bar assembly while it is operating, thereby to relieve the frame structure 20 of a certain amount of shock while the cutter bar is operating.

When the mower attachment is not being used for mowing purposes, the spring 70 may be disconnected from the assembly 50 and the pitman rod 40 may be disconnected from the knife member 55. A relatively short support element 70a pivotally attached to member 21 is provide for carrying the end of the pitman rod 40 after it has been disconnected as shown in FIG. 5. The cutter bar assembly 50 may be rotated in a clockwise direction into the position shown in FIG. 5 and may be secured in such position by a short length of chain (not shown) or the like, so that the cutter bar assembly will be retained in the position shown in FIG. 5 while the tractor is in motion.

Aside from the uses of the novel structure described hereabove, it should be understood that the mower assembly 10 is readily attached to a tractor 11 with the following connection: supporting elements 15; control members 16; support member 29 and extending element 30; shafts 26, 27 and, the link chains 18. Through the aforesaid arrangement, the mower attachment 10 is readily drawn behind a common tractor 11, with the hydraulic system therefor being provided to conventionally raise or lower the mower attachment, as desired.

From the preceding, it should be apparent that the applicant's novel mower attachment includes features not present in prior art structures, viz a novel arrangement of components which permits the swinging of the cutter bar from an outwardly extending position to a non-extended position immediately behind the tractor. This feature of the invention provides the important advantage of eliminating the necessity of the mower operator lifting the cutter bar assembly to a more or less vertical position and securing it therein after he has finished a particular mowing operation. It should be recognized that cutter bar assemblies of the type illustrated herein may be 10 ft. or 12 ft. in length and extremely heavy. Therefore, the operator is relieved of substantial physical strain and exertion in the operation of this invention.

This invention also provides the important advantage which consists of providing a mechanism which allows the entire cutter bar assembly to pivot whenever an obstruction is hit by the cutter bar. Considerable skill on the part of the operator is required in mowing closely adjacent to fences, boulders, trees and the like, and it often happens that a boulder or other obstruction may be concealed by tall grass or grain. Even a skilled operator cannot avoid hitting such obstructions at some time or other. Thus, there is provided a mower mechanism which inherently releases itself when an obstruction is hit, thereby preventing serious damage to the mechanism and extended delays in mowing operations for making repairs.

The invention claimed is:

1. In a mower attachment for a tractor, a frame member supported on said tractor to the rear thereof and in fixed transverse relation thereto, a framework pivotally mounted on said frame member centrally thereof for rotational movement in a horizontal plane, drive means mounted on said framework and including a forwardly extending drive shaft having a universal joint vertically aligned with the pivot point of said framework, a cutter bar assembly including a cutter bar pivotally mounted on said framework at one side thereof for rotation in a horizontal plane from an extended position outwardly of said framework to a position to the rear of said framework and parallel thereto, means for normally locking said framework to said frame member and releasable to permit rotation of said framework, and means connecting said cutter bar assembly to said framework for normally holding said assembly in extended position and detachable for permitting rotation of said assembly to its rearward position.

2. In a mower attachment for a tractor, a framework supported on said tractor to the rear thereof and in transverse relation thereto, drive means mounted on said framework, a cutter bar assembly having a longitudinal axis, means for pivotally mounting said assembly on said framework at one side thereof for rotation in a horizontal plane from an extended position outwardly of said framework to a position to the rear of said framework and parallel thereto such that said cutter bar assembly longitudinal axis is transverse to the longitudinal axis of said tractor, and means connecting said cutter bar assembly to said framework for normally holding said assembly in extended position and detachable for permitting rotation of said assembly to its rearward position.

References Cited in the file of this patent

UNITED STATES PATENTS

| | | |
|---|---|---|
| 49,608 | Cogswell | Aug. 29, 1865 |
| 146,465 | Maddock et al. | Jan. 13, 1874 |
| 863,557 | Riswold | Aug. 13, 1907 |
| 1,397,364 | Cook | Nov. 15, 1921 |
| 1,947,552 | Huddle | Feb. 20, 1934 |
| 2,248,332 | Budelier et al. | July 8, 1941 |
| 2,454,697 | Hilblom | Nov. 23, 1948 |
| 2,624,999 | Goodnight | Jan. 13, 1953 |